United States Patent Office 3,269,953
Patented August 30, 1966

3,269,953
STABILIZED SOLVENT
Eleanor Boothman, Widnes, England, assignor to Imperial Chemical Industries Limited, London, England, a corporation of Great Britain
No Drawing. Filed Apr. 23, 1964, Ser. No. 362,190
Claims priority, application Great Britain, May 6, 1963, 17,880/63
5 Claims. (Cl. 252—153)

This invention relates to a stabilized solvent, more particularly trichloroethylene.

Chlorinated hydrocarbons such as trichloroethylene are widely used as solvents for metal degreasing operations and many formulations incorporating stabilizers have been proposed for use in preventing decomposition of the solvents and corrosion of metals in contact with the solvents. The decomposition of the solvents is induced by heat, by light and by certain metals, particularly aluminum and its alloys. A number of tests have been devised to establish a satisfactory measure of the stability of formulations against specific types of decomposition which are likely to be encountered in commercial use of the solvents. Thus some tests measure the oxidative decomposition with the development of acidity and liberation of chloride ion which can occur under the influence of light and/or heat. Other tests measure the tar formation or the discoloration which can occur when the solvents are in contact with metals. The formulations hitherto proposed, although adequate for many conditions of commercial use, have not been entirely satisfactory in that they have tended to fail in one or more of the currently available tests. Clearly it is desirable for a formulation to show stability in as many tests as possible in order to provide a maximum margin of safety in use.

I have now found that especially efficient stabilization of trichloroethylene can be achieved by addition of an ether of a linear alkylene glycol, together with a heterocyclic nitrogenous base and an epoxide. This composition gives enhanced stability, compared with previously known compositions, in a test involving refluxing with powdered aluminum chloride. At the same time enhanced stability is achieved as assessed by another test, involving exposure of the solvent to ultraviolet light and measurement of the acidity and chloride ion produced.

Thus according to our present invention we provide a stabilized trichloroethylene composition which comprises trichloroethylene together with minor proportions of an other of a linear alkylene glycol, a heterocyclic nitrogenous base and an epoxide.

Suitable ethers of linear alkylene glycols include alkoxyalkanole having the formula $RO(CH_2)_xOH$, wherein $x$ has the value 2, 3 or 4 and R is an alkyl group or an alkoxyalkyl group such that the total number of carbon atoms in the molecule is not greater than 6.

I especially prefer to use 2-methoxyethanol.

Suitable epoxides include these containing up to four carbon atoms in the carbon chain, for example epichlorohydrin and butene oxide or a mixture of these two epoxides.

Suitable heterocyclic nitrogenous bases include N-alkylpyrroles, of which I especially prefer N-methylpyrrole.

The proportion of stabilizers to be used may be for example in the range 0.05% to 1% by weight of the linear alkylene glycol ether, in the range 0.01% to 0.1% by weight of the heterocyclic nitrogenous base, and 0.1% to 0.5 by weight of the epoxide, although proportions outside these ranges may be used if desired.

The invention is illustrated but not limited by the following examples in which the percentages are by weight.

Example 1

An 80 ml. sample of a trichloroethylene composition containing 0.25% of 2-methoxyethanol, 0.02% of N-methylpyrrole, 0.11% of epichlorohydrin and 0.22% of butene oxide was boiled under reflux in glass apparatus with 0.3 gram of powdered anhydrous aluminum chloride. After refluxing for four hours the solution was pale yellow and no tar had been formed.

For purposes of comparison, this procedure was repeated using other trichloroethylene compositions, with the following results:

(a) Trichloroethylene containing 0.02% of N-methylpyrrole, 0.11% of epichlorohydrin and 0.22% of butene oxide; after refluxing for four hours the solution was dark brown and there was a black tarry deposit on the bottom of the flask.

(b) A trichloroethylene composition as in (a) together with 0.25% of ethyl acetate; after refluxing for four hours the solution was amber, there was a black tarry deposit on the bottom of the flask and there was an orange/black deposit at the liquid level.

(c) A trichloroethylene composition as in (a) together with 0.25% of methyl ethyl ketone; after refluxing for four hours the solution was dark green and there was a thick black tarry deposit on the bottom of the flask.

Example 2

The procedure of Example 1 was repeated using a trichloroethylene composition containing 0.25% of 2-methoxyethanol, 0.001% of triethylamine, 0.02% of N-methylpyrrole, 0.11% of epichlorohydrin and 0.22% of butene oxide. After refluxing for four hours the solution was pale yellow and no tar had been formed.

For purposes of comparison the procedure was repeated using trichloroethylene containing 0.001% of triethylamine, 0.02% of N-methylpyrrole, 0.11% of epichlorohydrin and 0.22% of butene oxide. After refluxing for four hours the solution was dark brown and there was a heavy deposit of black tar on the bottom of the flask. There was also a fine black deposit on that portion of the glass apparatus which had been in contact with the liquid.

Example 3

The procedure of Example 1 was repeated using a trichloroethylene composition containing 0.25% of 2-methoxyethanol, 0.02% of N-methylpyrrole, 0.11% of epichlorohydrin, 0.2% of butene oxide and 0.25% of diisobutylene. After refluxing for four hours the solution was pale yellow and no tar had been formed.

For purposes of comparison the procedure was repeated using trichloroethylene containing 0.02% of N-methylpyrrole, 0.11% of epichlorohydrin, 0.22% of butene oxide and 0.25% of diisobutylene. After refluxing for four hours the solution was dark brown and there was a black tarry deposit on the flask. There was also a fine black deposit on that portion of the glass apparatus which had been in contact with the liquid.

Example 4

The procedure of Example 1 was repeated using a trichloroethylene composition containing 0.25% of 2-methoxyethanol, 0.25% of methyl ethyl ketone, 0.02% of N-methylpyrrole, 0.11% of epichlorohydrin, 0.22% of butene oxide, 0.25% of diisobutylene and 0.001% of triethylamine. After refluxing for four hours the solution was pale yellow and no tar had been formed.

Example 5

The procedure of Example 1 was repeated using a trichloroethylene composition containing 0.25% of 2-ethoxyethanol, 0.02% of N-methylpyrrole, 0.11% of epichlorohydrin and 0.22% of butene oxide. After refluxing for four hours the solution was yellow and there was a slight tarry deposit on the bottom of the flask.

*Example 6*

The procedure of Example 1 was repeated using a trichloroethylene composition containing 0.25% of 2-butoxyethanol, 0.02% of N-methylpyrrole, 0.11% of epichlorohydrin and 0.22% of butene oxide. After refluxing for four hours the solution was yellow and there was a slight tarry deposit on the bottom of the flask.

*Example 7*

The procedure of Example 1 was repeated using a trichloroethylene composition containing 0.25% of 2-methoxypropanol, 0.02% of N-methylpyrrole, 0.11% of epichlorohydrin and 0.22% of butene oxide. After refluxing for four hours the solution was dark yellow and there was a slight tarry deposit on the bottom of the flask.

*Example 8*

The procedure of Example 1 was repeated using a trichloroethylene composition containing 0.25% of 2-(2-methoxyethoxy)ethanol, 0.02% of N-methylpyrrole, 0.11% of epichlorohydrin and 0.22% of butene oxide. After refluxing for four hours the solution was light brown and there was a slight tarry deposit on the bottom of the flask.

*Example 9*

A 100 ml. sample of a trichloroethylene composition containing 0.25% of 2-methoxyethanol, 0.02% of N-methylpyrrole, 0.11% of epichlorohydrin, 0.22% of butene oxide, 0.001% of triethylamine and 0.25% of diisobutylene was placed in a colourless glass-stoppered bottle of approximately 200 ml. capacity. The bottle was placed at a standard distance from a source of ultra-violet light (a 200 watt mercury-vapor lamp) and illuminated continuously.

After illumination for twenty-four hours, 10 ml. of the sample were removed and made up to 250 ml. with distilled water. The acidity of the aqueous solution was measured by titration with 0.1 N sodium hydroxide solution using phenolphthalein as indicator; the chloride ion content of the same solution was measured by electrometric titration with 0.1 N silver nitrate solution. The acidity was found to be equivalent to only 0.1 ml. of 0.1 N sodium hydroxide and no chloride ion was detectable on titration with 0.1 N silver nitrate. After illumination for three hundred and sixty hours, another 10 ml. of the sample was removed and made up to 250 ml. with distilled water. The acidity was found to be equivalent to 3.9 ml. of 0.1 N sodium hydroxide and the chloride ion content was equivalent to 1.7 ml. of 0.1 N silver nitrate.

By way of comparison the same procedure was carried out using 100 ml. of a trichloroethylene composition containing 0.02% of N-methylpyrrole, 0.11% of epichlorohydrin, 0.22% of butene oxide, 0.001% of triethylamine and 0.25% of diisobutylene. After illumination for three hundred and sixty hours the acidity of a 10 ml. sample, measured in the same way, was equivalent to 13.0 ml. of 0.1 N sodium hydroxide and the chloride ion content was equivalent to 8.9 ml. of 0.1 N silver nitrate.

Again by way of comparison the same procedure was carried out using 100 ml. of trichloroethylene which did not contain any added stabilizer. After illumination for twenty-four hours the acidity of a 10 ml. sample, measured in the same way, was equivalent to 5.45 ml. of 0.1 N sodium hydroxide and the chloride ion content was equivalent to 5.1 ml. of 0.1 N silver nitrate.

Again by way of comparison the same procedure was carried out using 100 ml. of trichloroethylene containing 0.25% of 2-methoxyethanol as the only added stabilizer. After illumination for twenty-four hours the acidity of a 10 ml. sample, measured in the same way, was equivalent to 4.0 ml. of 0.1 N sodium hydroxide and the chloride ion content was equivalent to 3.1 ml. of 0.1 N silver nitrate.

*Example 10*

The procedure of Example 9 was repeated using a 100 ml. sample of a trichloroethylene composition containing 0.25% of 2-methoxyethanol, 0.25% of methyl ethyl ketone, 0.02% of N-methylpyrrole, 0.11% of epichlorohydrin, 0.22% of butene oxide, 0.001% of triethylamine and 0.25% of diisobutylene.

After illumination for 360 hours the acidity of a 10 ml. sample was equivalent to 3.15 ml. of 0.1 N sodium hydroxide and the chloride ion content was equivalent to 2.0 ml. of 0.1 N silver nitrate solution.

What I claim is:

1. Stabilized trichloroethylene consisting essentially of trichloroethylene and, as the essential stabilizing components therefor, (1) from 0.05% to 1.0% by weight of an alkoxyalkanol of the formula $RO(CH_2)_xOH$ wherein $x$ has a value of 2 to 4, and R is selected from the group consisting of alkyl and alkoxyalkyl such that the total number of carbon atoms in the molecule is not greater than 6; (2) from 0.01% to 0.1% by weight of N-methylpyrrole; and (3) from 0.1% to 0.5% by weight of epoxide selected from the group consisting of epichlorohydrin, butene oxide and mixtures thereof.

2. Stabilized trichloroethylene according to claim 1 wherein said alkoxyalkanol is 2-methoxyethanol; said N-alkylpyrrole is N-methylpyrrole; and said epoxide is a mixture of epichlorohydrin and butene oxide.

3. Stabilized trichloroethylene according to claim 1 wherein the ether is 2-methoxyethanol.

4. The method of stabilizing trichloroethylene which comprises adding thereto (1) an alkoxyalkanol of the formula $RO(CH_2)_xOH$ wherein $x$ has a value of 2 to 4 and R is selected from the group consisting of alkyl and alkoxyalkyl such that the total number of carbon atoms in the molecule is not greater than 6; (2) N-methylpyrrole; and (3) an epoxide selected from the group consisting of epichlorohydrin, butene oxide and mixtures thereof, in amounts such that said stabilized trichloroethylene contains between 0.05% and 1.0% by weight of said alkoxyalkanol, 0.01% to 0.1% by weight of N-alkylpyrrole; and 0.1% to 0.5% by weight of epoxide.

5. The method of claim 4 wherein said alkoxyalkanol is 2-methoxyethanol; said N-alkylpyrrole is N-methylpyrrole; and said epoxide is a mixture of epichlorohydrin and butene oxide.

References Cited by the Examiner

UNITED STATES PATENTS

| | | | |
|---|---|---|---|
| 2,797,250 | 6/1957 | Copelin | 260—652.5 |
| 2,973,392 | 2/1961 | Graham | 260—652.5 |
| 2,978,518 | 4/1961 | Daras et al. | 260—652.5 |

FOREIGN PATENTS

| | | |
|---|---|---|
| 765,522 | 1/1957 | Great Britain. |

LEON D. ROSDOL, *Primary Examiner.*

JULIUS GREENWALD, *Examiner.*

J. T. FEDIGAN, *Assistant Examiner.*